(12) United States Patent
Yang et al.

(10) Patent No.: US 7,615,516 B2
(45) Date of Patent: Nov. 10, 2009

(54) MICROEMULSION CONTAINING OIL FIELD CHEMICALS USEFUL FOR OIL AND GAS FIELD APPLICATIONS

(75) Inventors: Jiang Yang, Missouri City, TX (US); Vladimir Jovancicevic, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 639 days.

(21) Appl. No.: 11/334,164

(22) Filed: Jan. 18, 2006

(65) Prior Publication Data

US 2006/0166835 A1 Jul. 27, 2006

Related U.S. Application Data

(60) Provisional application No. 60/645,684, filed on Jan. 21, 2005.

(51) Int. Cl.
C09K 8/524 (2006.01)
C09K 8/68 (2006.01)
E21B 43/16 (2006.01)

(52) U.S. Cl. .......... 507/90; 507/203; 166/305.1
(58) Field of Classification Search .......... 507/90, 507/203; 166/305.1
See application file for complete search history.

(56) References Cited

U.S. PATENT DOCUMENTS

| 3,899,431 | A | 8/1975 | Hayes et al. |
| 4,036,300 | A | 7/1977 | Holm et al. |
| 4,360,061 | A * | 11/1982 | Canter et al. .............. 166/270.1 |
| 4,687,590 | A | 8/1987 | Haack |
| 5,008,026 | A | 4/1991 | Gardner et al. |
| 5,094,296 | A | 3/1992 | DaGue |
| 6,581,687 | B2 | 6/2003 | Collins et al. |
| 6,613,720 | B1 | 9/2003 | Feraud et al. |
| 6,793,025 | B2 * | 9/2004 | Patel et al. ..................... 175/50 |
| 2003/0166472 | A1 | 9/2003 | Pursley et al. |

OTHER PUBLICATIONS

T. N. C. Dantas, et al., "Microemulsion System as a Steel Corrosion Inhibitor," Corrosion, Sep. 2002, pp. 723-727, vol. 58, No. 9, NACE International.
J. Paktinat, et al., "Microemulsion Reduces Adsorption and Emulsion Tendencies in Bradford and Speechley Sandstone Formations," SPE 93270, 2005 SPE International Symposium on Oilfield Chemistry, Feb. 2-4, 2005, Houston, Texas.
G. Penny, et al., "The Application of Microemulsion Additives in Drilling and Stimulation Results in Enhanced Gas Production," SPE 94274, 2005 SPE Production and Operations Symposium, Apr. 17-19, 2005, Oklahoma City, Oklahoma.
PCT International Search Report for International Application No. PCT/US06/01746, Oct. 3, 2006.

* cited by examiner

*Primary Examiner*—Timothy J Kugel
(74) *Attorney, Agent, or Firm*—Mossman Kumar & Tyler PC

(57) ABSTRACT

Useful microemulsions have corrosion inhibitors in the internal phase and an external phase and at least one surfactant that helps define the emulsion. The corrosion inhibitor itself may have its pH adjusted so that it also serves the role of surfactant. The corrosion inhibitors form microemulsions with particle or droplet diameters of about 10 to about 300 nm. The microemulsions may be oil-in-water, water-in-oil or bi-continuous.

33 Claims, No Drawings

MICROEMULSION CONTAINING OIL FIELD CHEMICALS USEFUL FOR OIL AND GAS FIELD APPLICATIONS

CROSS-REFERENCE TO RELATED APPLICATION

This application claims the benefit of U.S. Provisional Patent Application No. 60/645,684 filed Jan. 21, 2005.

TECHNICAL FIELD

The invention relates to the use of corrosion inhibitors in oil and gas field applications, and most particularly relates, in one non-limiting embodiment, to using microemulsions to deliver corrosion inhibitors in oil and gas field applications.

BACKGROUND

It is well known that steel tubulars and equipment used in the production of oil and gas are exposed to corrosive environments. Such environments generally consist of acid gases ($CO_2$ and $H_2S$) and brines of various salinities. Under such conditions the steel will corrode, possibly leading to equipment failures, injuries, environmental damage and economic loss. Further in some cases, drilling fluids have acid intentionally added thereto in order to acidize the formations to enhance hydrocarbon recovery. This added acid also causes corrosion problems.

While the rate at which corrosion will occur depends on a number of factors such as metallurgy, chemical nature of the corrosive agent, salinity, pH, temperature, etc., some sort of corrosion almost inevitably occurs. One way to mitigate this problem consists of using corrosion inhibitors in the hydrocarbon production system.

Corrosion inhibitors are widely used in oil and gas production wells and pipeline transmission lines. The corrosion inhibitors are generally high viscosity liquids. In order to form a pumpable product, a solvent is usually used to dilute the inhibitors and form a relatively low viscosity fluid. In general, the use of a large amount of solvent is undesirable since it increases the product cost and may contribute to flammability.

It is known that the corrosion of iron and steel alloys in contact with oil-in-brine emulsions can be inhibited by treating the emulsions with a water soluble polymer, specifically water soluble anionic, non-ionic and cationic polymers and/or nitrogen-containing corrosion inhibitors.

A microemulsion is a thermodynamically stable fluid. It is different from kinetically stable emulsions which will be break into oil and water over time. Water-in-oil microemulsions have been known to deliver water soluble oil field chemicals into subterranean rock formations. Also known are oil-in-alcohol microemulsions containing corrosion inhibitors in anti-freeze compositions.

It would be advantageous if a new corrosion inhibitor were discovered that would be an improvement over the presently known systems. It is always desirable to produce greater corrosion inhibiting ability using less corrosion inhibiting material and/or less inert material, particularly if the inert material is relatively expensive. It would also be useful if the corrosion inhibitor was stable during storage and reduced in flammability as compared with conventional corrosion inhibitors.

SUMMARY

In carrying out these and other objects of the invention, there is provided, in one form, a method of adding an oil field chemical to a fluid that involves providing a fluid including, but not necessarily limited to, water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids. An oil field chemical-containing microemulsion is introduced to the fluid. The oil field chemical-containing microemulsion includes a non-aqueous internal phase that contains the oil field chemical, where the oil field chemical additionally has a surfactant property and the oil field chemical is present in an amount effective to form a stable microemulsion of droplets of the internal phase in the external phase. The microemulsion additionally includes an aqueous external phase.

Alternatively, the a non-aqueous internal phase includes the oil field chemical; an aqueous external phase; and at least one surfactant of a kind and amount effective to form a stable microemulsion of droplets of the internal phase in the external phase. The surfactant is discrete and separate from the oil field chemical.

There is also provided, in another non-restrictive form, a method of improving the corrosion inhibition of a fluid that may be water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids. The method additionally involves introducing a corrosion inhibitor-containing microemulsion to the fluid in an amount effective to improve the corrosion inhibition thereof. The corrosion inhibitor-containing microemulsion includes an internal phase including a corrosion inhibitor, an external phase and at least one surfactant of a kind and amount effective to form a stable microemulsion of internal phase droplets in the external phase.

DETAILED DESCRIPTION

It has been discovered that microemulsions can be used to "solubilize" or deliver oil-soluble oil field chemicals, e.g. corrosion inhibitors, using less organic or non-aqueous solvent. The microemulsion also increases the dispersibility of oil field chemicals into the produced fluids, pumped fluids, and the like, thus increasing the performance of the chemical. In addition, the compositions and methods herein may additionally or alternatively incorporate other oil field chemicals such as corrosion products removers, asphaltene inhibitors, scale inhibitors, scale dissolvers, paraffin inhibitors, gas hydrate inhibitors, biocides, pH modifiers, metal chelators, metal complexors, antioxidants, wetting agents, clay stabilizers, wax inhibitors, wax dissolvers, wax dispersants, $H_2S$ scavengers, waterflow inhibitors, sand consolidation additives, permeability modifiers, foaming agents, microorganisms, nutrients for microorganisms, salts, polymers, polymer stabilizers, crosslinkers, and breakers. These oil field chemicals may exist in oil-soluble (non-aqueous) and/or water-soluble (aqueous) forms. If these other oil field chemicals are incompatible with the corrosion inhibitors, they may be incorporated into different droplets or particles and subsequently mixed in a procedure including, but not necessarily limited to mixing them prior to introduction into the fluid. Alternatively, the other oil field chemicals may be present in the other phase.

It will also be appreciated that the methods and compositions herein are not limited to the case where the oil field chemical is oil soluble. The microemulsion may be designed in such a way that the internal phase is water which contains a water-soluble oil field chemical and the external phase is non-aqueous.

It will be appreciated that although the methods and compositions are often discussed herein for the embodiment where the oil field chemical is a corrosion inhibitor, the methods and compositions may be adapted to deliver, inject, provide and otherwise introduce a different oil field chemical. Many oil and gas production and flow lines contain significant levels of water in the liquid phase. As previously noted, such lines may be in danger of corrosion. Suitable fluids to which the compositions and methods herein may be applied include, but are not necessarily limited to, water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids. Hydrocarbon systems may also be defined herein as any liquid system that has at least 0.5% of hydrocarbon component in it. Hydrocarbon systems include, but are not necessarily limited to, multiphase flowlines and vessels (for example oil/water, oil/water/gas) in oil and gas production systems. It will be appreciated that by the term "hydrocarbon fluid", it is expected that oxygenated or nitrogenated hydrocarbons such as lower alcohols, glycols, amines, ethers, and the like may be included within the definition. The term "hydrocarbon fluid" also means any fluid that contains hydrocarbons, as defined herein to also include oxygenated hydrocarbons. Thus, multiphase hydrocarbon-containing systems (e.g. oil/water, oil/water/gas), such as oil and gas production flowlines are primary applications for this technology.

In general, microemulsions are known in the art, and are known to be fundamentally different from regular emulsions. Microemulsions are thermodynamically stable systems. In one non-limiting embodiment, the particle size of microemulsions ranges from about 10 nm to about 300 nm. In a different non-restrictive embodiment, the particle size of the microemulsion is not particularly important as long as the emulsion is a thermodynamically stable one—a distinguishing characteristic of microemulsions. Microemulsions typically appear as clear or translucent solutions. The particle sizes of microemulsions may be identified by dynamic light scattering or neutron scattering or other suitable technique. Because of the small particle sizes, microemulsions appear as clear or translucent solutions. Microemulsions have ultralow interfacial tension between the water phase and the oil phase or non-aqueous phase.

As noted, microemulsions increase the dispersibility of the oil field chemical (e.g. a corrosion inhibitor) into fluids, such as dispersed fluids, and thus increase the performance of the oil field chemical (e.g. inhibitor). Microemulsions may also incorporate other incompatible oil-soluble oilfield chemicals and water-soluble oil-field chemicals as alternatives to or additions to the one initially used. For instance, the oil-soluble oilfield chemical such as a corrosion inhibitor may be in the internal phase, whereas the water-soluble scale inhibitor may be in the aqueous external phase.

In further detail, the microemulsion herein contains or includes an oil field chemical, at least one surfactant and water, where in one non-limiting embodiment an external phase is aqueous and an internal phase is non-aqueous. Alternatively, the microemulsion can either be water-in-oil or a bi-continuous microemulsion. It will be appreciated that a bi-continuous microemulsion does not strictly have an internal phase or an external phase. As such, a bi-continuous microemulsion does not necessarily have particles, although it may have both aqueous particles in the non-aqueous portion along with non-aqueous particles inside an aqueous portion, where the aqueous and non-aqueous regions occasionally become discontinuous. It will be appreciated that the microemulsions herein will be most commonly described in terms of a non-aqueous internal phase and an aqueous external phase, primarily because many known corrosion inhibitors are generally oil-soluble, but the micro-emulsions herein are not limited to these particular embodiments.

The compositions herein may also include a co-solvent or oil when it is necessary to form such microemulsions. The oil field chemical itself may act as the oil phase or as the surfactant per se depending upon its solubility, as will be described in more detail below.

In another non-restrictive embodiment, a microemulsion may have proportions of from about 1 to about 90 wt % oil field chemical, from about 5 to about 96% water, and about 0.2 to about 50 wt % total surfactant. In another non-limiting embodiment, the proportions may range from about 1 to about 95 wt % oil field chemical, from about 3 to about 98% water, and about 0.1 to about 50 wt % total surfactant. In the case where the oil field chemical also serves the role of the surfactant, the microemulsion may include from about 1 to about 90 wt % oil field chemical and from about 10 to about 99 wt % water.

Suitable corrosion inhibitors to be used with the microemulsions herein may be any or most known corrosion inhibitors, and likely those to be developed in the future. Such corrosion inhibitors include, but are not necessarily limited to, alkanolamides, alkyl phosphate esters, thiophosphate esters, fatty acids such as alkyl dimeric acids, maleated fatty acids, imidazolines, sulfur-containing inhibitors, and the like. The alkyl chain lengths may range from 8 to 24 carbon atoms. In one non-limiting embodiment, an unsaturated chain such as oleyl may be used. Other examples of corrosion inhibitors are compounds for inhibiting corrosion on steel, especially under anaerobic conditions, and may especially be film formers capable of being deposited as a film on a metal surface e.g. a steel surface such as a pipe-line wall. Such compounds may be non-quaternized long aliphatic chain hydrocarbyl N-heterocyclic compounds, where the aliphatic hydrocarbyl group may have from 5 to 12 or more carbon atoms; mono- or di-ethylenically unsaturated aliphatic groups e.g. of 8-24 carbons such as oleyl, etc. The N-heterocyclic group can have 1-3 ring nitrogen atoms with 5-7 ring atoms in each ring; imidazole and imidazoline rings are suitable in one non-limiting embodiment. The ring may also have an aminoalkyl e.g. 2-aminoethyl and/or hydroxyalkyl e.g. 2-hydroxyethyl substituents.

Suitable scale inhibitors include those effective in stopping calcium and/or barium scale with threshold amounts rather than stoichiometric amounts. Acceptable scale inhibitors include, but are not necessarily limited to, water-soluble organic molecules with at least 2 carboxylic and/or phosphonic acid and/or sulphonic acid groups, e.g. 2-30 such groups. In another non-restrictive version, the scale inhibitor may be an oligomer or a polymer, or may be a monomer with at least one hydroxyl group and/or amino nitrogen atom, especially in a hydroxycarboxylic acid or hydroxy or aminophosphonic, or sulphonic acid. The inhibitor may be used primarily for inhibiting calcium and/or barium scale, but other scales may also be prevented. Non-limiting examples of such compounds used as inhibitors are aliphatic phosphonic acids with 2-50 carbons, such as hydroxyethyl diphosphonic acid, and aminoalkyl phosphonic acids, e.g. polyaminomethylene phosphonates with 2-10 N atoms, e.g. each bearing at least one methylene phosphonic acid group; examples of the latter include, but are not limited to, ethylenediamine tetra-(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other scale inhibitors include polycarboxylic acids such as acrylic, maleic, lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts, in some non-limiting embodiments.

In one non-restrictive version, suitable asphaltene inhibitors include, but are not limited to, amphoteric fatty acids or salts of an alkyl succinate, while suitable wax inhibitors include, but are not limited to, a polymer such as an olefin polymer e.g. polyethylene or a copolymeric ester, e.g. ethylene-vinyl acetate copolymer, and suitable wax dispersants include, but are not limited to, polyamides. Suitable hydrogen sulfide scavengers include, but are not limited to, oxidants, such as inorganic peroxides, e.g. sodium peroxide, or chlorine dioxide, or an aldehyde, e.g. of 1-10 carbons such as formaldehyde or glutaraldehyde or (meth)acrolein. Appropriate gas hydrate inhibitors include, but are not limited to, solid polar compounds, which may be polyoxyalkylene compounds or alkanolamides, or tyrosine or phenylalanine.

In another non-restrictive embodiment, the amount of oil field chemical used is in the range from 1-50% w/w of the non-aqueous phase, suitably from 5-40% w/w, alternatively from 6-30% w/w. Within these ranges the amount used would depend upon the nature of the chemical used and its intended purpose.

In one non-limiting embodiment, the surfactant may be the corrosion inhibitor per se with an adjusted pH to give the necessary microemulsion-forming characteristics. In a non-limiting example, the addition of base to increase pH will convert a fatty acid into a surfactant-soap. Further and alternatively, the addition of acid will protonate an amine and make it water-soluble. It should be understood that not all oil field chemicals need to have their pH adjusted to impart sufficient surfactant properties necessary to create a microemulsion, i.e. they may naturally possess such surfactant characteristics.

Conventional surfactants such as anionic, nonionic, cationic and amphoteric surfactants may also be used. Suitable anionic surfactants include, but are not necessarily limited to, alkyl sulfates, sulfonates, sulfosuccinates, phosphates, alkyl benzene sulfonates and the like. Other suitable anionic surfactants include, but are not necessarily limited to, fatty carboxylates, alkyl sarcosinates, alkyl phosphates, alkyl sulfonates, alkyl sulfates and the like and mixtures thereof. The alkyl chain length on the surfactants may range from 8 to 24 carbon atoms.

Suitable nonionic surfactants include, but are not necessarily limited to, alkoxylated alcohols or ethers, alkyl ethoxylates, alkylamido ethoxylates, alkylamine ethoxylates, alkyl glucosides, alkoxylated carboxylic acids, sorbitan derivatives, again where the alkyl chain length may range from 8 to 24 carbon atoms. More specific examples include, but are not necessarily limited to nonylphenol ethoxylate-3, alkyl ethoxylates-3, oleyl carboxylic diethylamides, and the like and mixtures thereof.

Suitable surfactants and mixtures thereof include, but are not necessarily limited to, cationic surfactants such as, monoalkyl quaternary amines, such as cocotrimethylammonium chloride, cetyltrimethylammonium chloride, stearyltrimethylammonium chloride, soyatrimethylammonium chloride, behentrimethylammonium chloride, and the like and mixtures thereof. Other suitable cationic surfactants that may be useful include, but are not necessarily limited to, dialkylquaternary amines such as dicetyldimethylammonium chloride, dicocodimethylammonium chloride, distearyldimethylammonium chloride, and the like and mixtures thereof.

The amphoteric/zwitterionic surfactants that may be useful include, but are not necessarily limited to, alkyl betaines, alkylamido propyl betaines, alkylampho acetates, alkylamphopropionates, alkylamidopropyl hydroxysultaines and the like and mixtures thereof.

Optional co-solvents include, but are not necessarily limited to alcohols, glycols, fatty alcohols, alkyl glycol ethers with chain lengths from 3 to 8 carbon atoms, where the chains may be straight or branched. In one non-limiting embodiment, the chain length may be from 4 to 6. Specific examples of suitable co-solvents include, but are not necessarily limited to, isopropanol, butanol, pentanol, hexanol, butyl monoglycol ether, butyl diglycol ether, and the like and mixtures thereof.

Solvents optionally used in the hydrocarbon internal phase may include, but not necessarily be limited to, mineral oil, mineral spirits, or other combinations of straight, branched, alicyclic, or aromatic hydrocarbons. In one non-limiting embodiment of the invention, the hydrocarbons in the external phase have from about 7 to about 18 carbon atoms.

The microemulsions discussed herein may be readily made by combining the various components and applying mixing, agitation or turbulence until a suitable microemulsion is formed.

As noted, the microemulsions may also include other oil field chemicals including, but not necessarily limited to, asphaltene inhibitors, scale inhibitors, paraffin inhibitors and hydrate inhibitors, etc.

Additionally, the microemulsions with oil field chemicals may be used in batch treatments or introduced by continuous injection, such as through capillary injection. Further, the microemulsions may be used in umbilical applications to subsea pipelines. The product may also be introduced into the well by batching the product down the tubing either in a procedure known as "batch and fall" or by tubing displacement. These microemulsion formulations are expected to be higher performance and of lower cost than conventional pure solvent-based oil field chemicals, since solvents are more expensive than water. It is also expected that these microemulsion oil field chemicals will be more environmentally friendly since less solvent is used. These microemulsions should also have the benefit of having a lower flash point since less solvent is present. In addition, concentrated products may be formulated with mutually incompatible and/or synergistic intermediates.

It is difficult to predict in advance what an effective use concentration should be because such concentration is dependent upon many interrelated variables in the system being treated, including, but not necessarily limited to, the nature of the fluid, the temperature of the fluid, the nature of the oil field chemicals, the nature of the surfactant, etc. Nevertheless, to give some sense of typical concentrations, one non-limiting effective use concentration range of the microemulsion in the fluid is 1 to 4000 ppm as product in the fluid. In another non-limiting embodiment of the invention, the lower threshold of the concentration range is at about 30 ppm, where the upper threshold of the concentration range may be up to about 1000 ppm, or 500 ppm, alternatively up to 100 ppm of microemulsion product based on the total fluid treated.

It is expected that in one non-limiting embodiment the microemulsion is broken and/or inverted to deliver the corrosion inhibitor to the pipeline, production system, or other equipment desired to be protected. The microemulsions may be broken or inverted by a variety of mechanisms, such as by chemical or temperature means, but one common way is expected to be simple dilution. Methods for destabilizing or breaking the microemulsion include, but are not necessarily limited to, a change in temperature, a change in pH, a change in salinity, a change in alcohol concentration, a change in stabilizing surfactant concentration, a change in organic ion concentration, a change in destabilizing surfactant concentration, a change in surfactant adsorbent material concentration, an ultrasonic pulse, and an electrical field, and combinations thereof.

To further illustrate the invention, the compositions and methods herein will be additionally described by way of the following non-limiting Examples, which are intended only to further show specific embodiments of the invention, but not to limit it in any way.

EXAMPLE 1

One embodiment of the oil-in-water microemulsion containing corrosion inhibitor has the following composition:
  2 wt % toluene
  4 wt % oleic imidazoline (corrosion inhibitor)
  4 wt % oleic acid (corrosion inhibitor)
  2 wt % dodecylbenzene sulfonic acid
  2 wt % ethanolamine
  20 wt % butyl alcohol
  66 wt % water The above ingredients were blended in sequence. A clear and stable microemulsion was obtained. The resulting oil-in-water microemulsion was easily diluted to the water phase.

EXAMPLE 2

One embodiment of a water-in-oil microemulsion containing corrosion inhibitor has the following composition:
  16 wt % oleic imidazoline (corrosion inhibitor)
  16 wt % oleic acid (corrosion inhibitor)
  8 wt % dodecylbenzene sulfonic acid
  5 wt % ethanolamine
  11 wt % butyl alcohol
  33 wt % toluene
  11 wt % water The above ingredients were blended in sequence. A clear and stable microemulsion was obtained. The resulting water-in-oil microemulsion was easily dissolved a hydrocarbon solvent.

EXAMPLE 3

Copper displacement tests were run with 30 ppm corrosion inhibitor in NACE/Isopar M as a 90/10 mixture with $CO_2$ purged at 60° C. for 5 hours, then dipped into 10% $CuSO_4$ solution. The results presented in Table I demonstrate that the corrosion inhibitor in microemulsion has better coverage than that of the same corrosion inhibitor in the same amount delivered as a conventional oil based corrosion inhibitor. This difference was determined by a visual inspection of the coupons. The improvement was visually noticeable.

TABLE I

| Conventional oil soluble corrosion inhibitor | | Microemulsion corrosion inhibitor | |
|---|---|---|---|
| Component | Wt % | Component | Wt % |
| Oleyl imidazoline amide | 5.0 | Oleyl imidazoline amide | 5.0 |
| Oleic acid | 3.0 | Oleic acid | 3.0 |
| Oleyl imidazoline | 3.0 | Oleyl imidazoline | 3.0 |
| Nonylphenol ethoxylate phosphate | 2.0 | Nonylphenol ethoxylate phosphate | 2.0 |
| Aromatic solvent | 87.0 | Butanol | 15.0 |
| | | Nonyl phenol ethoxylate-10 | 3.0 |
| | | Glacial acetic acid | 4.0 |
| | | Water | 65.0 |

EXAMPLE 4

Other oilfield chemicals can be also included together with a corrosion inhibitor, such as scale inhibitor (e.g. 1-hydroxyethanediphosphonic acid). The formula given below (wt %) was demonstrated as a microemulsion:

| | |
|---|---|
| Oleyl imidazoline | 12% |
| Oleic acid | 2% |
| Glacial acetic acid | 4% |
| Nonyl phenol ethoxylate-10 | 4% |
| Butanol | 14% |
| 1-Hydroxyethanediphosphonic acid | 10% |
| Water | 54% |

Many modifications may be made in the composition and implementation of this invention without departing from the spirit and scope thereof that are defined only in the appended claims. For example, the microemulsions may be different from those explicitly used and described here. Additionally, oil field chemicals or additives, e.g. corrosion inhibitors, among others, surfactants, optional solvents, etc. other than those specifically mentioned may find utility in the methods and compositions of this invention. Various combinations of water, corrosion inhibitors and surfactants, besides those explicitly mentioned herein, and in different proportions than those mentioned herein, are also expected to find use as effective and improved microemulsions.

What is claimed is:

1. A method of adding an oil field chemical to a fluid comprising:
  providing a fluid selected from the group consisting of water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids;
  introducing an oil field chemical-containing microemulsion to the fluid, where the oil field chemical-containing microemulsion comprises:
    a non-aqueous internal phase comprising the oil field chemical, where the oil field chemical additionally has a surfactant property and the oil field chemical is present in an amount effective to form a stable microemulsion of droplets of the internal phase in the external phase; and
    an aqueous external phase; and breaking the microemulsion to add the oil field chemical to the fluid.

2. The method of claim 1 where the fluid is in a well and little or no fluid is present in a subterranean formation.

3. The method of claim 2 further comprising producing the fluid from a well.

4. The method of claim 1 where the oil field chemical is selected from the group consisting of:
acidic oil field chemicals to which sufficient base has been added to impart surfactant property thereto; and
basic oil field chemicals to which sufficient acid has been added to impart surfactant property thereto; and
mixtures thereof.

5. The method of claim 1 where the external phase comprises water and the internal phase further comprises a co-solvent selected from the group of branched or straight-chain alcohols, glycols and alkyl glycol ethers having from 3 to 8 carbon atoms.

6. The method of claim 1 where the microemulsion comprises:
about 1 to about 90 wt % oil field chemical; and
about 10 to about 99 wt % water.

7. The method of claim 1 where the microemulsion further comprises an additional oil field chemical and the internal phase comprising the oil field chemical are separate droplets from the internal phase comprising the additional oil field chemical.

8. The method of claim 1 where the concentration of the microemulsion in the fluid ranges from about 1 to about 4000 ppm.

9. The method of claim 1 where the microemulsion is continuously injected into the fluid.

10. The method of claim 1 where the oil field chemical that is a corrosion inhibitor is selected from the group consisting of aliphatic amines, saturated and unsaturated fatty acids, alkanolamides, alkyl phosphate esters, thiophosphate esters, imidazolines, sulfur-containing inhibitors, and mixtures thereof.

11. The method of claim 1 further comprising transporting the fluid through a conduit.

12. A method of adding an oil field chemical to a fluid comprising:
providing a fluid selected from the group consisting of water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids;
introducing an oil field chemical-containing microemulsion to the fluid, where the oil field chemical-containing microemulsion comprises:
a non-aqueous internal phase comprising the oil field chemical;
an aqueous external phase; and
at least one surfactant of a kind and amount effective to form a stable microemulsion of droplets of the internal phase in the external phase; and
breaking the microemulsion to add the oil field chemical to the fluid.

13. The method of claim 12 where the fluid is in a well and little or no fluid is present in a subterranean formation.

14. The method of claim 13 further comprising producing the fluid from a well.

15. The method of claim 12 where the external phase comprises water and the internal phase further comprises a co-solvent selected from the group of branched or straight-chain alcohols, glycols and alkyl glycol ethers having from 3 to 8 carbon atoms.

16. The method of claim 12 where the microemulsion comprises:
about 1 to about 90 wt % oil field chemical;
about 5 to about 96% water; and
about 0.2 to about 50 wt % total surfactant.

17. The method of claim 12 where the oil field chemical is selected from the group consisting of corrosion inhibitors, corrosion products removers, asphaltene inhibitors, scale inhibitors, scale dissolvers, paraffin inhibitors, gas hydrate inhibitors, biocides, pH modifiers, metal chelators, metal complexors, antioxidants, wetting agents, clay stabilizers, wax inhibitors, wax dissolvers, wax dispersants, $H_2S$ scavengers, waterflow inhibitors, sand consolidation additives, permeability modifiers, foaming agents, microorganisms, nutrients for microorganisms, salts, polymers, polymer stabilizers, crosslinkers, and breakers.

18. The method of claim 12 where the microemulsion further comprises an additional oil field chemical and the internal phase comprising the oil field chemical are separate droplets from the internal phase comprising the additional oil field chemical.

19. The method of claim 12 where the concentration of the microemulsion in the fluid ranges from about 1 to about 4000 ppm.

20. The method of claim 12 where the microemulsion is continuously injected into the fluid.

21. The method of claim 12 further comprising transporting the fluid through a conduit.

22. A method of improving the corrosion inhibition of a fluid comprising:
providing a fluid selected from the group consisting of water; mixtures of hydrocarbons and water; mixtures of hydrocarbons, water and gas; mixtures of hydrocarbons, water and solids; mixtures of hydrocarbons, water, gas and solids; mixtures of water, gas, and solids; and mixtures of water and solids;
introducing a corrosion inhibitor-containing microemulsion to the fluid in an amount effective to improve the corrosion inhibition thereof, where the corrosion inhibitor-containing microemulsion comprises:
a non-aqueous internal phase comprising a corrosion inhibitor;
an aqueous external phase; and
at least one surfactant of a kind and amount effective to form a stable microemulsion of droplets of the internal phase in the external phase; and
breaking the microemulsion to add the corrosion inhibitor to the fluid;
where the corrosion inhibition of the fluid is increased as compared with an identical method except that the corrosion inhibitor is not added in a microemulsion but is instead added directly or in an emulsion that is not a microemulsion.

23. The method of claim 22 where the microemulsion further comprises an additional oil field chemical selected from the group consisting of corrosion products removers, asphaltene inhibitors, scale inhibitors, scale dissolvers, paraffin inhibitors, gas hydrate inhibitors, biocides, pH modifiers, metal chelators, metal complexors, antioxidants, wetting agents, clay stabilizers, wax inhibitors, wax dissolvers, wax dispersants, $H_2S$ scavengers, waterflow inhibitors, sand consolidation additives, permeability modifiers, foaming agents, microorganisms, nutrients for microorganisms, salts, polymers, polymer stabilizers, crosslinkers, and breakers.

24. The method of claim 23 where the internal phase comprising the corrosion inhibitor are separate droplets from the internal phase comprising the additional chemical.

25. The method of claim 22 where the fluid is in a well and little or no fluid is present in a subterranean formation.

26. The method of claim 25 further comprising producing the fluid from a well.

27. The method of claim 22 where the external phase comprises water and the internal phase further comprises a co-solvent selected from the group of branched or straight-chain alcohols, glycols and alkyl glycol ethers having from 3 to 8 carbon atoms.

28. The method of claim 22 where the microemulsion comprises:

about 1 to about 90 wt % corrosion inhibitor;

about 5 to about 96% water; and about 0.2 to about 50 wt % total surfactant.

29. The method of claim 22 where the concentration of the microemulsion in the fluid ranges from about 1 to about 4000 ppm.

30. The method of claim 22 where the microemulsion is continuously injected into the fluid.

31. The method of claim 22 where the corrosion inhibitor is selected from the group consisting of consisting of aliphatic amines, saturated and unsaturated fatty acids, alkanolamides, alkyl phosphate esters, thiophosphate esters, imidazolines, sulfur-containing inhibitors, and mixtures thereof.

32. The method of claim 22 further comprising transporting the fluid through a conduit.

33. The method of claim 22 where corrosion inhibition is greater when the corrosion inhibitor is introduced in the microemulsion as compared to corrosion inhibition obtained where the same corrosion inhibitor is introduced in the same amount without a microemulsion.

* * * * *